United States Patent
Stolitzka et al.

(10) Patent No.: US 10,015,496 B2
(45) Date of Patent: Jul. 3, 2018

(54) METHOD AND APPARATUS FOR TEMPORAL REFERENCE CODING WITH LIGHT CODING SYSTEMS FOR DISPLAY SYSTEMS

(71) Applicant: SAMSUNG DISPLAY CO., LTD., Yongin, Gyeonggi-do (KR)

(72) Inventors: Dale F. Stolitzka, Los Altos, CA (US); Ning Lu, Saratoga, CA (US)

(73) Assignee: Samsung Display Co., Ltd., Yongin-si (KR)

(*) Notice: Subject to any disclaimer, the term of this patent is extended or adjusted under 35 U.S.C. 154(b) by 70 days.

(21) Appl. No.: 15/077,833

(22) Filed: Mar. 22, 2016

(65) Prior Publication Data

US 2016/0286220 A1  Sep. 29, 2016

Related U.S. Application Data

(60) Provisional application No. 62/138,226, filed on Mar. 25, 2015.

(51) Int. Cl.
| | |
|---|---|
| *H04N 19/00* | (2014.01) |
| *H04N 19/137* | (2014.01) |
| *H04N 19/587* | (2014.01) |
| *H04N 19/119* | (2014.01) |
| *H04N 19/146* | (2014.01) |
| *H04N 19/176* | (2014.01) |

(Continued)

(52) U.S. Cl.
CPC ............ *H04N 19/137* (2014.11); *G09G 5/39* (2013.01); *H04N 19/107* (2014.11); *H04N 19/119* (2014.11); *H04N 19/146* (2014.11); *H04N 19/176* (2014.11); *H04N 19/507* (2014.11); *H04N 19/587* (2014.11); *G09G 2320/106* (2013.01); *G09G 2360/12* (2013.01)

(58) Field of Classification Search
CPC .......................... H04N 19/137; H04N 19/119
USPC ...................................... 375/240.12
See application file for complete search history.

(56) References Cited

U.S. PATENT DOCUMENTS 5,719,632 A * 2/1998 Hoang ............ H04N 21/23406
375/240.05
8,879,623 B2  11/2014 Lee
(Continued)

OTHER PUBLICATIONS

Sullivan, G., et al., "The H.264/AVC Advanced Video Coding Standard: Overview and Introduction to the Fidelity Range Extensions," Presented at the SPIE Conference on Applications of Digital Image Processing XXVII, Special Session on Advances in the New Emerging Standard: H.264/AVC, Aug. 2004, pp. 1-22.

*Primary Examiner* — Jeffery Williams
(74) *Attorney, Agent, or Firm* — Lewis Roca Rothgerber Christie LLP

(57) ABSTRACT

A system and method for transmitting frames of video data to a display. Each frame is divided up into blocks, and the data from each of the resulting blocks is coded using temporal reference coding, along with intraframe coding. In one embodiment a difference block is formed by taking the difference between a block in a second frame of a sequence of frames, and a corresponding block, in the same position, in a first frame of the sequence of frames. The difference block is coded using intraframe coding, to form a coded difference block. The coded difference block is transmitted to a display; processing hardware in the display reconstructs the sequence of frames.

16 Claims, 7 Drawing Sheets

(51) Int. Cl.
*G09G 5/39* (2006.01)
*H04N 19/107* (2014.01)
*H04N 19/507* (2014.01)

(56) References Cited

U.S. PATENT DOCUMENTS

| | | | |
|---|---|---|---|
| 2010/0128797 A1* | 5/2010 | Dey | H04N 19/176 375/240.24 |
| 2014/0098857 A1 | 4/2014 | MacInnis et al. | |
| 2014/0362098 A1 | 12/2014 | Kerofsky | |
| 2014/0376607 A1* | 12/2014 | Kurupati | H04N 19/503 375/240.02 |

* cited by examiner

| Original | | | | |
|---|---|---|---|---|
| 8 | 6 | 7 | 7 | |
| 7 | 0 | 3 | 4 | |
| 1 | 2 | 1 | 8 | |
| 3 | 5 | 5 | 1 | |

*FIG. 4A*

| Quantized, frame 1 | | | | |
|---|---|---|---|---|
| 8 | 6 | 8 | 6 | |
| 8 | 0 | 2 | 4 | |
| 2 | 2 | 0 | 8 | |
| 4 | 4 | 6 | 0 | |

| Dithered frame 2 | | | | |
|---|---|---|---|---|
| 8 | 6 | 6 | 8 | |
| 6 | 0 | 4 | 4 | |
| 0 | 2 | 2 | 8 | |
| 5 | 6 | 4 | 2 | |

| Lossless rendering | | | | |
|---|---|---|---|---|
| 8 | 6 | 7 | 7 | |
| 7 | 0 | 3 | 4 | |
| 1 | 2 | 1 | 8 | |
| 3 | 5 | 5 | 1 | |

*FIG. 4D*

METHOD AND APPARATUS FOR TEMPORAL REFERENCE CODING WITH LIGHT CODING SYSTEMS FOR DISPLAY SYSTEMS

CROSS-REFERENCE TO RELATED APPLICATION(S)

The present application claims priority to and the benefit of U.S. Provisional Application No. 62/138,226, filed Mar. 25, 2015, entitled "METHOD AND APPARATUS FOR TEMPORAL REFERENCE CODING WITH LIGHT CODING SYSTEMS FOR DISPLAY SYSTEMS", the entire content of which is incorporated herein by reference.

FIELD

One or more aspects of embodiments according to the present invention relate to video displays, and more particularly to a method and apparatus for temporal reference coding with light coding systems for display systems.

BACKGROUND

An interface for transmitting video data to a display may, if it transmits full rate uncompressed data, consume significant amounts of power and may require large numbers of parallel data channels or data channels capable of transmitting high rate data, either of which may increase cost. Related art standards for transmitting video data, such as the Video Electronics Standards Association (VESA) Display Stream Compression (DSC) Standard, may compress each picture or frame individually, and, as a result, achieve a compression ratio that may not be acceptable in some applications.

Intraframe coding may create no dependency between a current frame and a previous or subsequent picture frame. Temporal coding, however, may code a reference frame, and a plurality of subsequent frames may be predicted frames that contain only differences between the original and the reference. It may not be possible to decode a predicted frame without the original, and this may result in an average compression over a group of frames that may be significantly less than the compression achieved with a method using intraframe coding only. Examples of temporal coding codecs include MPEG-2, ITU-T Rec., H.264, Rec. H.265, etc.

However, there is still a need for a method and apparatus for coding that provides improved performance.

SUMMARY

Aspects of embodiments of the present disclosure are directed toward a method and apparatus for temporal reference coding with light coding systems for display systems.

According to an embodiment of the present invention there is provided a method for coding a sequence of image frames, the method including: partitioning a first frame of the sequence of image frames into a first plurality of blocks; partitioning a second frame of the sequence of image frames into a second plurality of blocks, the second frame immediately following the first frame in the sequence of image frames, a block of the second plurality of blocks being the same size as a corresponding block of the first plurality of blocks, and the block of the second plurality of blocks being in the same position within the second frame as the position, within the first frame, of the corresponding block of the first plurality of blocks; calculating a difference between the block of the second plurality of blocks and the corresponding block of the first plurality of blocks to form a difference block; and coding the difference block, without employing motion vectors, to form a coded difference block.

In one embodiment, the method includes transmitting the coded difference block to a display.

In one embodiment, the method includes transmitting the corresponding block of the first plurality of blocks to the display.

In one embodiment, the coding of the difference block includes coding the difference block utilizing a constant bit rate coding process.

In one embodiment, the coding of the difference block includes coding the difference block utilizing a variable bit rate coding process.

In one embodiment, the method includes adding a pseudorandom variation to the difference block in a pixel location of the difference block having a pixel value of zero.

In one embodiment, the method includes: decoding the difference block to form a decoded difference block; adding the decoded difference block to an image block of a preceding frame to form a display image block; and displaying the display image block utilizing a display panel.

In one embodiment, the method includes adding a pseudorandom variation to the decoded difference block in a pixel location of the decoded difference block having a pixel value of zero.

In one embodiment, a value of a pixel of the difference block is represented by an 8-bit binary number.

In one embodiment, the method includes: a signed significand; and an unsigned exponent.

In one embodiment, the signed significand is a 4-bit signed significand; and the unsigned exponent is a 4-bit unsigned exponent.

According to an embodiment of the present invention there is provided a system, including: a video generator; and a display, the video generator being configured to: generate a sequence of image frames; partition a first frame of the sequence of image frames into a first plurality of blocks; partition a second frame of the sequence of image frames into a second plurality of blocks, the second frame immediately following the first frame in the sequence of image frames, a block of the second plurality of blocks being the same size as a corresponding block of the first plurality of blocks, and the block of the second plurality of blocks being in the same position within the second frame as the position, within the first frame, of the corresponding block of the first plurality of blocks; form a difference block between the block of the second plurality of blocks and the corresponding block of the first plurality of blocks; and code the difference block, without employing motion vectors, to form a coded difference block.

In one embodiment, the video generator is further configured to transmit the coded difference block to the display.

In one embodiment, the video generator is further configured to transmit the corresponding block of the first plurality of blocks to the display.

In one embodiment, the coding of the difference block includes coding the difference block utilizing a constant bit rate coding process.

In one embodiment, the coding of the difference block includes coding the difference block utilizing a variable bit rate coding process.

In one embodiment, the video generator is further configured to add a pseudorandom variation to the difference block in a pixel location of the difference block having a pixel value of zero.

In one embodiment, the display is configured to: decode the difference block to form a decoded difference block; add the decoded difference block to an image block of a preceding frame to form a display image block; and display the display image block utilizing a display panel.

In one embodiment, the display is further configured to add a pseudorandom variation to the decoded difference block in a pixel location of the decoded difference block having a pixel value of zero.

According to an embodiment of the present invention there is provided a system, including: a video generator; and a display, the video generator including: means for partitioning a first frame of the sequence of frames into a first plurality of blocks; means for partitioning a second frame of the sequence of frames into a second plurality of blocks, the second frame immediately following the first frame in the sequence of frames, a block of the second plurality of blocks being the same size as a corresponding block of the first plurality of blocks, and the block of the second plurality of blocks being in the same position within the second frame as the position, within the first frame, of the corresponding block of the first plurality of blocks, a means for forming a difference block between the block of the second plurality of blocks and the corresponding block of the first plurality of blocks; and means for coding the difference block, without employing motion vectors, to form a coded difference block.

BRIEF DESCRIPTION OF THE DRAWINGS

These and other features and advantages of the present invention will be appreciated and understood with reference to the specification, claims, and appended drawings wherein:

FIG. 4A is a pixel value diagram of an original image, according to an embodiment of the present invention;

FIG. 4B is a pixel value diagram of a quantized image in a first frame, according to an embodiment of the present invention;

FIG. 4C is a pixel value diagram of a dithered image in a second frame, according to an embodiment of the present invention;

FIG. 4D is a pixel value diagram of an average image, according to an embodiment of the present invention.

DETAILED DESCRIPTION

The detailed description set forth below in connection with the appended drawings is intended as a description of exemplary embodiments of a method and apparatus for temporal reference coding with light coding systems for display systems provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Embodiments of the present invention provide a low complexity way to extend an related art coding system compression ratio beyond related art limits. In some embodiments, a combination of simple intraframe coding and simple temporal delta coding or dithering with respect to a known predicted reference image is used. Each frame may be independently decodable, and rendered picture quality may be improved using information from all displayed frames. As a result, target compression may be better for the same quality than if only using related art intraframe coding. Embodiments of the present invention extend related art coding systems with little added complexity and with backward compatibility. Embodiments of the present invention are applicable to data transfer in raster-scan or block-based order.

Temporal reference coding with light coding is applicable to both raster scan and block based systems. For example, some related art image and video compression technologies take square picture pieces as working units. The square picture pieces may, for example, be structured as 8×8 or 16×16 blocks of sub pixels.

Figure 1:
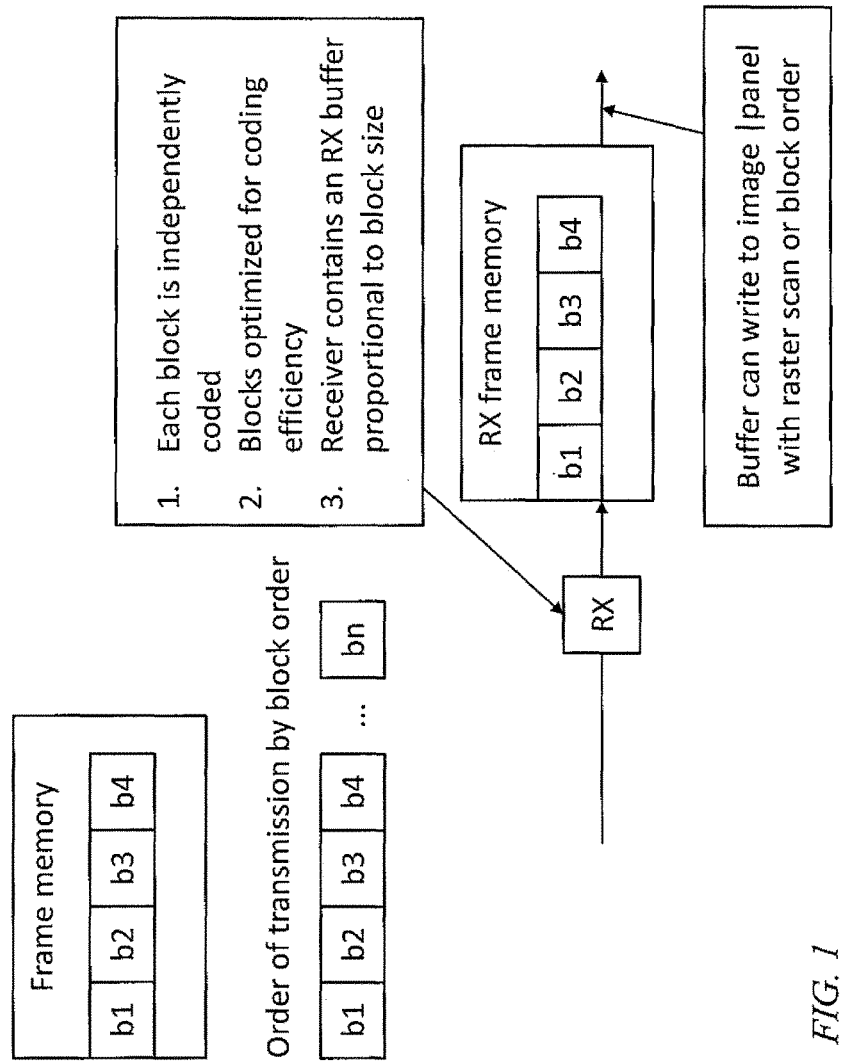
FIG. 1 is a hybrid block and dataflow diagram showing coding and decoding, according to an embodiment of the present invention.

Referring to FIG. 1, in one embodiment, coded image data is stored and transmitted sequentially one block at a time. Blocks b1, b2, . . . , bn are each independently coded and transferred. Some related art coding systems also fix the block size to a special location in order to deliver data easily to the display processor. In the embodiment of FIG. 1, a block-based system and method of coding and transmission is used. Related art image and video compression technologies may take square picture pieces as working units, e.g., in 8×8 or 16×16 sub-pixels. In embodiments of the present invention, as shown in FIG. 1, coded image data can be stored and transmitted sequentially one block at a time. Some related art coding systems may fix the block size to spatial location in order to deliver data easily to the display processor. However, a fixed block may cost more in coding efficiency. If the block is permitted to vary by borrowing coding space from a neighbor, coding efficiency may increase. This may mean, for example, that a larger region of pixels may have more area to average out difficult-to-compress pieces of the image.

In some embodiments a hybrid approach of these concepts is employed. For low latency transmission, an image frame is divided into groups of coding blocks. The data size for the block can vary, but the size for each group is fixed. When the group to be coded is one block, the image is said to be coded in fixed block size. When the group to be coded is the whole frame, the image is said to be coded in fixed frame size (borrowing across blocks or between frames in a temporal domain).

Given the latency budget for a given transmission bandwidth, such as streaming, the image and video quality may be optimized by varying coded frame size, which may be referred to as constant bit rate (CBR). In a model where the transmission bandwidth may vary, the adapted image and video coding may be referred to as variable bitrate (VBR) coding.

For displays, low latency may be desired, to provide an acceptable user experience. Fixed size coding may provide such low latency. Moreover, the pixel layout of the display panel may be changed from line scan to a block-based order with each block fixed spatially. In some embodiments display (receiver) frame buffers store an image for rendering.

In operation, the display receives the block groups at a frame buffer (RX frame memory in FIG. 1) which stores the image for rendering. Frame buffers in the receiver can be useful to save power when an image is static (i.e. there are no differences between frames) or when the image is changing (small temporal differences). Even with a high rate-of-motion, the temporal difference in sequential frames can be small. If the difference is smaller on average than the quantization needed to completely code each frame individually, then using difference coding between the temporal reference image and the next image may yield a positive coding gain. Since display frames may be similar or identical in many locations, temporal correlation may be advantageous.

Figure 2A:
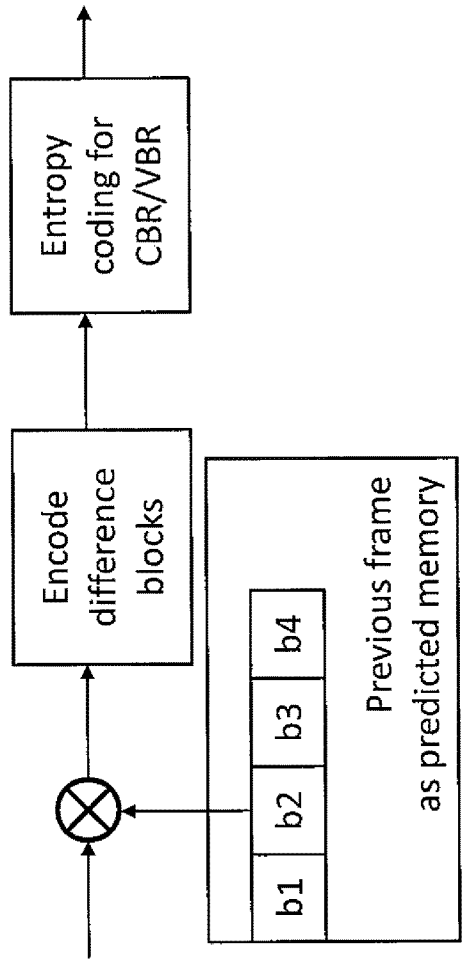
FIG. 2A is a hybrid block and dataflow diagram showing coding and decoding, according to an embodiment of the present invention.
Figure 2B:
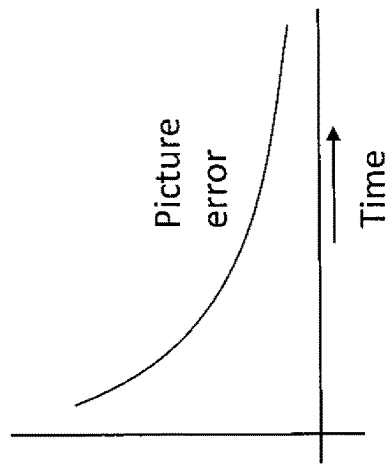
FIG. 2B is a graph of picture error as a function of time, according to an embodiment of the present invention.

Referring to FIGS. 2A and 2B, in some embodiments, instead of sending display image data, only the temporal difference data are compressed and sent, after an initial image is sent. For computational simplicity, the temporal reference coding takes the difference of the new block with the same spatially located block in predicted memory. Coding may lessen the quantization required to code each difference frame, improving quality at the programmed bitrate. For CBR coding, the image quality at a lower target number of bits per pixel may be improved relative to only intraframe coding. For VBR coding, the system may send less data, including only temporal data information and thus may conserve power. In either case, the decoder may reverse the process. The decoder includes a stored reference block in the local frame buffer.

Sending temporal differences in a compressed lossy format and at a small data rate, the display quality may remain high. Display quality may be adjusted to be visually lossless to observers in several ways. For a static image, the display image may improve to mathematically lossless (perfect) over time, as shown in FIG. 2B. When a first data block that is received is lossy and therefore contains errors, subsequent data blocks are used to correct the error until the image produced is perfect relative to the original image. Similarly, small motions may result in less quantization in difference coding (e.g., resulting in better quality), and large motions may lead to no less quality than the quality that may be produced by a related art system. Moreover, fast motion may obscure errors, and may be difficult for the naked human eye to catch in any event. In some embodiments a temporal difference method not only provides high data transmission efficiency, it also provides a new core technology for enhanced displays.

According to one embodiment, DSC or other light coding systems that use CBR mode may be extended by using the coding system configured to add a temporal reference coding extension. In one example, the temporal reference coding extension utilizes an existing intraframe coding mechanism (core coding). The coding system extends with a temporal design using related art prediction methods of various coding systems. For example, the coding system operates within core coding, Modified Median Adaption Prediction (MMAP), Mid-point Prediction (MP), and other systems. The coding system operates by adding temporal difference data versus a predicted slice and is compatible with raster scan configurations. For each new slice (frame) that is sent to the receiver, the temporal difference between the new slice and the previous slice is calculated. The temporal difference between two frames can be coded with the existing intraframe coding (core coding). The result is that quality can be improved for any given bit rate target and memory allocation and line buffer design can be improved.

In some embodiments, an 8-bit signed floating point representation with an unsigned exponent may be used to transmit difference data (which may also be referred to as 8-bit temporal additive data). For each 8-bit datum, 4 bits are used for the unsigned power-2 multiplier (i.e., for the exponent), 1 bit is used for the sign of the significand, and 3 bits for the top (most significant) 3 bits of the significand. Using this representation, any 19-bit signed number may be approximated with good accuracy. For static data, the representation may become mathematically lossless within 6 frames.

For example, if an integer value to be transmitted is 1513, it may be represented in binary format as 1513=1024+256+128+64+32+8+1=0101 1110 1001 in bits, e.g., in a 12-bit representation. The top (most significant) 3 bits starting from the most significant 1 are 101 with a multiplier of 256 (=$2^8$, i.e. the power is 8). Thus, when the integer 1513 is represented in 8 bits in the form of: SMMMEEEE (S-sign, M-MSBs (or significand), E-power of multiplier (or exponent)), it becomes 0 101 1000 (where spaces have been inserted to show the boundaries between the sign field S (the first bit, i.e., 0), the significand MMM (the following three bits, i.e., 101) and the exponent EEEE (the final four bits, i.e., 1000). This 8-bit number (0101 1000) represents the number 1280 (=1024+256), and may be used in an immediate frame (e.g., in a first frame) to approximate the value 1513. In this example, in the immediate frame, Frame 1, the value 1280 will be used instead of 1513. The subsequent frame will add 224 of the remaining 233:

233=128+64+32+8+1=1110 1001 in bits (i.e., in binary format).

In the 8-bit SMMMEEEE floating point representation, 233 is represented as

111b×$2^5$=>0 111 0101=>224,

Thus, in Frame 2, the value 1504 (=1280+224) will be displayed. And after two frames, the system will send, in the third frame, the remaining:

9=8+1=1001 in bits (i.e., in binary format).

In the 8-bit SMMMEEEE floating point representation, 9 is represented as

100b×2=>0 100 0001=>8.

The binary representation 0 100 0001 is not a unique way to represent the integer 8 in the SMMMEEEE floating point representation; it may for example also be represented as 0 001 0011. Therefore, the value 1512 will be displayed in Frame 3. The value 1513 will then be displayed in the $4^{th}$ and subsequent frames.

The sequence of numbers sent to successively approximate a value is not unique, and a different sequence than, e.g., the one above, could be used, and may result in higher quality in the displayed image. For example, the same value 1513 can be decomposed into:

1513=(1024+512)−(16+4)−(2+1), i.e., the three floating point numbers 01101000, 11010010, and 10110000 may be sent instead, so that the values in the first 3 frames would be 1536, 1516, and 1513 instead.

Thus, transmitting 12-bit blocks of data may be reduced to transmitting 8-bit blocks of data in a lossy format that improves in fidelity when an image does not change. In some cases, display devices refresh at rates that are significantly higher than the rate at which video sources provide new material. For example, a display may refresh at 240 Hz, but a video may be recorded at 30 frames per second. This disparity may result in the same frame of video being displayed in 8 consecutive display frames. Using the above example, the first two frames that are displayed would exhibit some distortion when compared to the original image. However, by the second frame the error may be relatively small, and for the third through $8^{th}$ frame, the image may be lossless and a user's perception of the display may be that it is lossless.

Generally, when a sequence of image frames is to be transmitted, each frame may be partitioned into a plurality of blocks. The block partitioning may be the same for each image frame, i.e., for each block in one of the frames, there may be a corresponding block, of the same size and in the same location, in each of the other frames of the sequence of image frames. Differences may be formed between blocks in one image frame and corresponding blocks in a preceding image frame. The differences may be coded (or "encoded") block by block, or the blocks may be grouped into groups of blocks, and the differences may be encoded for each group.

In one embodiment, the transmitter encodes a first image block to be transmitted using lossy coding to form a first encoded block, and sends the first encoded block to the display. The transmitter then decodes the first block using the same process employed in the receiver (i.e., in the display) to form a first display block, that includes any errors introduced by the lossy coding. In the display, the receiver decodes the first encoded block to also form the first display block, and the display displays it. The transmitter then forms a first difference block as the difference between a second image block to be transmitted and the first display block. This first difference block is encoded to form a first encoded difference block, and transmitted to the display. In the display, the first encoded difference block is decoded to form a first decoded difference block, the first decoded difference block is added to the first display block (which remains in predictive memory after having been displayed), to form a second display block, and the second display block is displayed.

A third image block to be transmitted may be processed in a similar manner. The transmitter forms the second display block using the same process employed in the receiver, and then forms a second difference block as the difference between the third image block and the second display block. The transmitter encodes the second difference block to form a second encoded difference block, the display decodes it to form a second decoded difference block, adds the second decoded difference block to the second display block to form a third display block, and displays the third display block. The coding (or "encoding") may involve, in any order, CBR or VBR encoding and/or DSC and/or representing (e.g., integer) pixel data using a floating point representation, such as an 8-bit floating point representation, and the decoding may involve the corresponding decoding acts, performed in the reverse order.

Figure 3A:
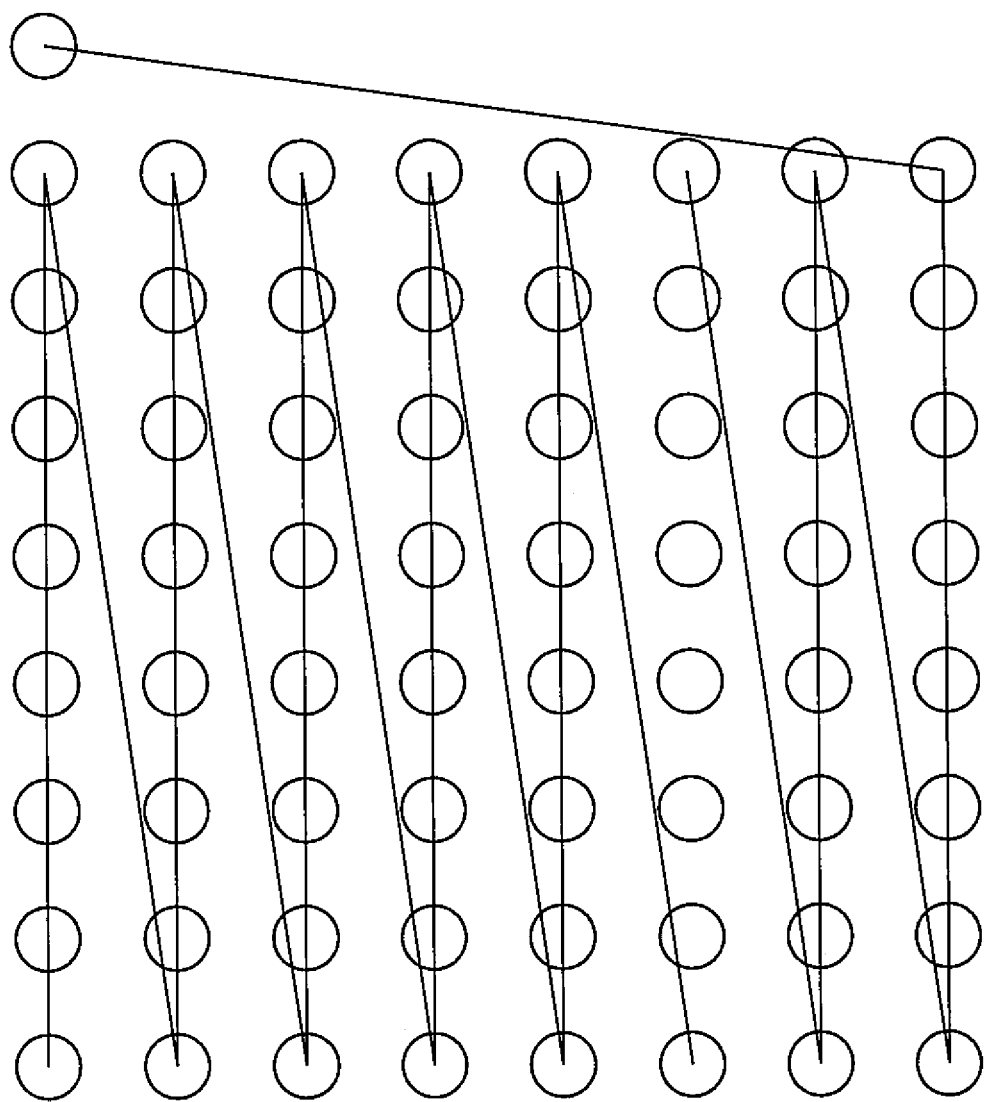
FIG. 3A is a scan order representation for a raster scan within a 16×16 image block, according to an embodiment of the present invention.
Figure 3B:
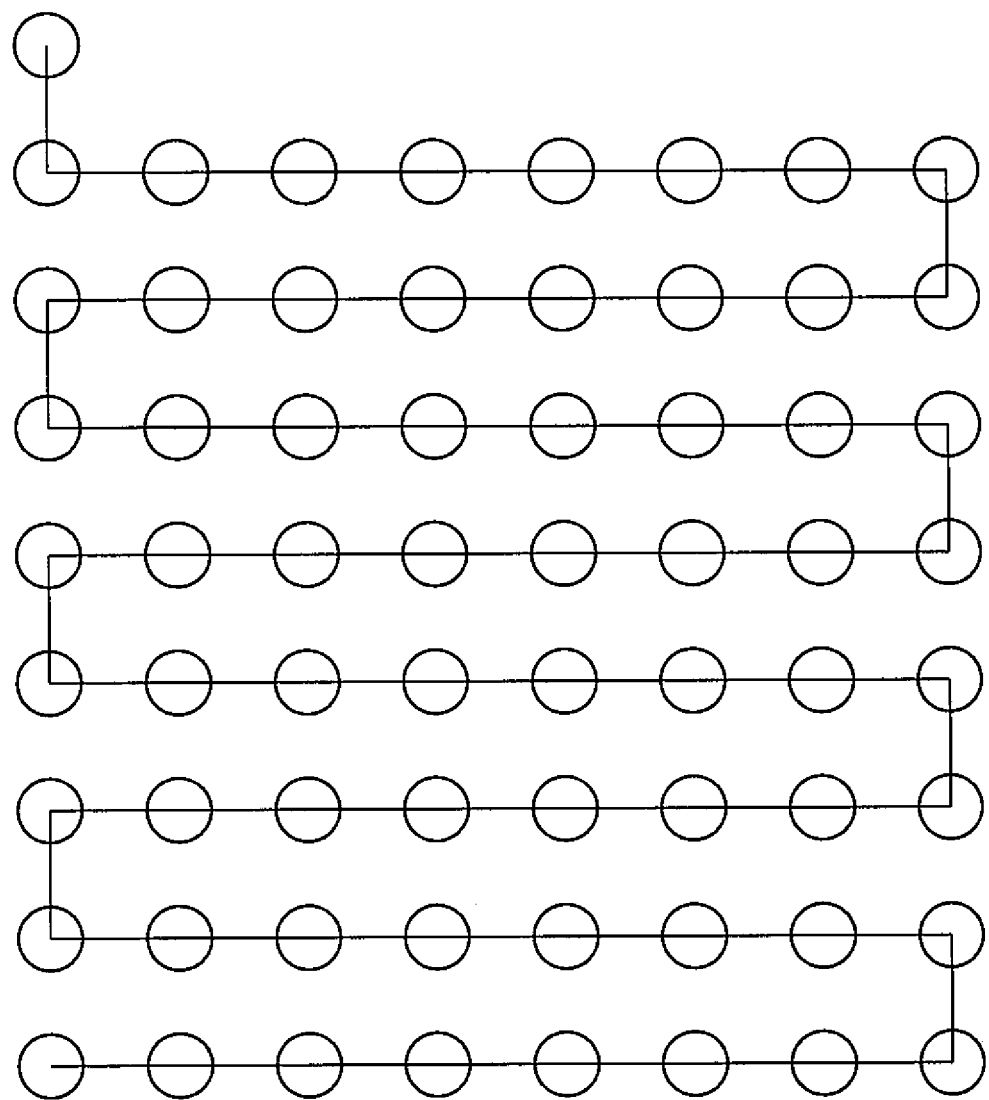
FIG. 3B is a scan order representation for a continuous scan within a 16×16 image block, according to an embodiment of the present invention.
Figure 3C:
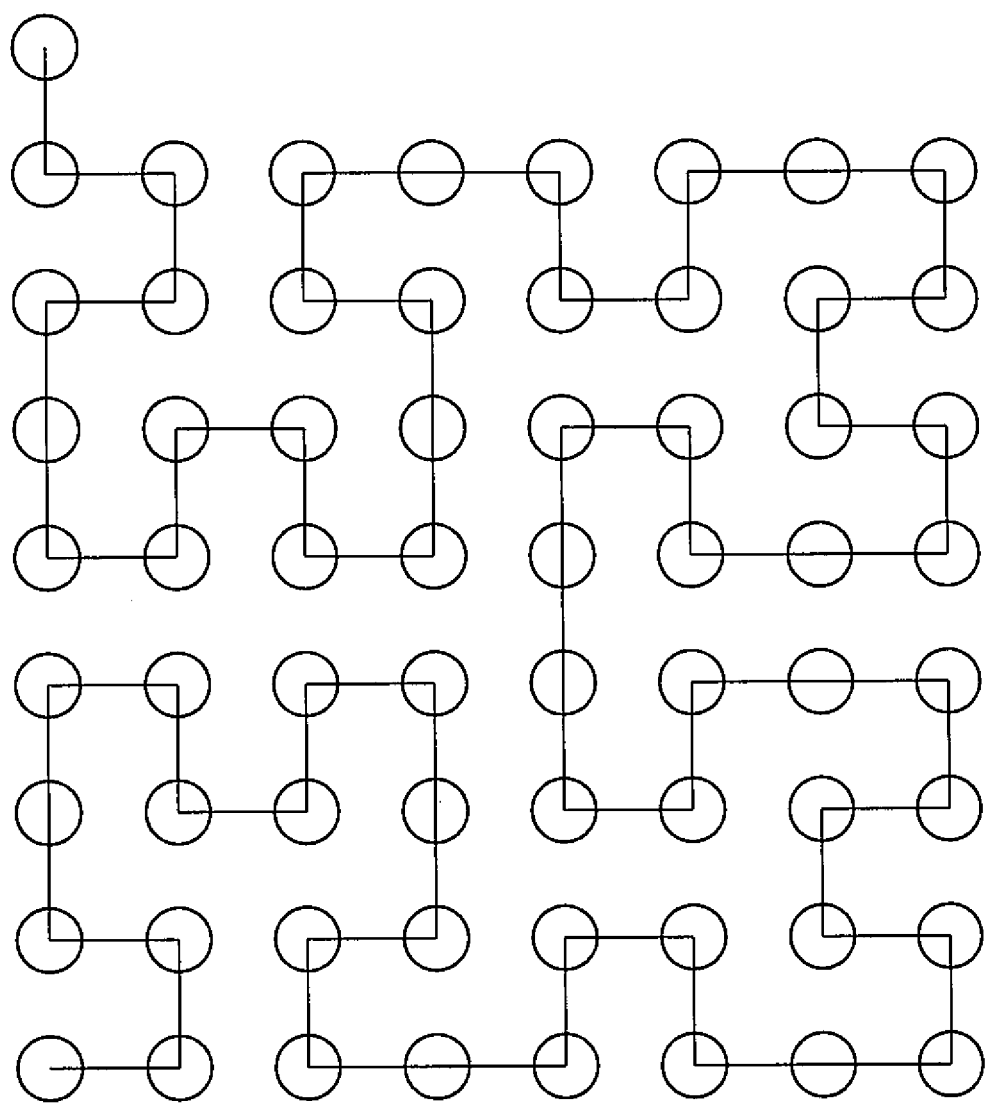
FIG. 3C is a scan order representation for a Koch curve scan within a 16×16 image block, according to an embodiment of the present invention.

In another embodiment, the system accepts a block-based input of the compressed pixel data that can be converted to block-based display addressing. A display can be updated in arrangements of local columns and rows in blocks, raster scanning within each block. The pixel order within the block can be customized for better hardware implementation. For example, FIGS. 3A-3C illustrate three efficient intra-block scanning methods for a 16×16 block. The method used may depend on the display technology and the position of the traditional "row" and "column" addressing scheme within an active matrix panel. Given that a display's refresh rate may be significantly higher than the content capture rate, temporal dithering of difference data may be an effective way to display high dynamic range data with high accuracy using less than an 8-bit channel.

In some embodiments, temporal dithering may be used to reduce pixel stickiness. In some displays, panel longevity may be reduced as a result of color stickiness caused by displaying the same pixel value at the same location for a long time. In some embodiments this reduction in longevity may be mitigated by temporally dithering the pixel value, i.e., adding some random variation temporally. Logic may be added to the display to track which pixels would benefit from dithering. If temporal difference data are sent to the display, then the temporal difference data may be used to track which pixels are to be dithered, making the additional logic unnecessary. For example, the zero difference identifies each pixel that to be dithered and this information can be automatically used to trigger the temporal dithering engine. The random variation (i.e., the dither) may be either be added in a graphics processor driving the display or added in the receiver (e.g., in the display) in order to extend display panel longevity.

To control transmission error propagation, non-difference data may be interleaved to refresh an entire frame at a much lower rate than without temporal reference coding. For example if the quantization is 2, for an original frame illustrated in FIG. 4A, the two frames of FIGS. 4B and FIG. 4C may be displayed, averaging to the frame of FIG. 4D, which is equal to the original frame, (i.e., the average image is equal to the original frame).

In a first exemplary embodiment, constant bit rate coding (CBR coding) is used. This embodiment may extend DSC or other light coding systems when using in CBR (constant bit rate) mode with a simple temporal reference coding extension. This embodiment may use related art intraframe coding (core coding), and extend, with a temporal design, related art prediction methods that may be used in core coding, such as Modified Median Adaption Prediction (MMAP) or Midpoint Prediction (MP). This embodiment may add temporal differences versus the predicted slice, and may be used with raster scan for backwards compatibility. Memory allocation and line buffer design may be improved by using a block (slice)-based input to the display. The first exemplary embodiment may apply to raster-scan based input to the display, and may extend DSC and other light coding systems with a simple temporal reference compression extension.

This may be implemented as follows. The system may calculate a temporal difference between a new slice and the previous predicted slice. The temporal difference between two frames may then be coded using related art intraframe coding (core coding). This embodiment may improve quality at any given bit rate target, may be used with a raster scan for backwards compatibility, and may improve memory allocation and line buffer design by using block (slice)-based input.

In a second exemplary embodiment, variable bit rate coding (VBR coding) is used. This exemplary embodiment extends DSC or other light coding systems when used in VBR (variable bit rate) mode with a simple temporal reference coding extension. This embodiment may use related art intraframe coding (core coding); e.g., it may calculate a temporal difference between two frames and code with the existing intraframe tools (core coding). VBR coding allows only the difference from a previously predicted frame to be coded, resulting in a reduction in data, and in power consumed. This embodiment may be used with a raster scan for backwards compatibility, may improve memory allocation and line buffer design by using block (slice)-based input, and may apply to raster-scan based input to the display. In the second exemplary embodiment, the system may calculate a temporal difference between a new slice and a previous predicted slice. VBR coding may allow only the difference from a previously predicted frame to be sent over the display link thus reducing data payload and power; this may allow the link to sleep. As used herein, a "sleep" state is any reduced power management mode, that may also be referred to, for example, as a "hibernate" state. In such a reduced power management mode the link may not be sending data or may be sending data at a significantly reduced data rate.

In a third exemplary embodiment, the system accepts a block-based input of the compressed pixel data that can be converted to block based display addressing. A display may be updated in arrangements of local columns and rows in blocks, raster scanning within each block. The pixel scan order within the block may be customized for better hardware implementation, as illustrated for example in FIGS. 3A-3C.

Figure 5:
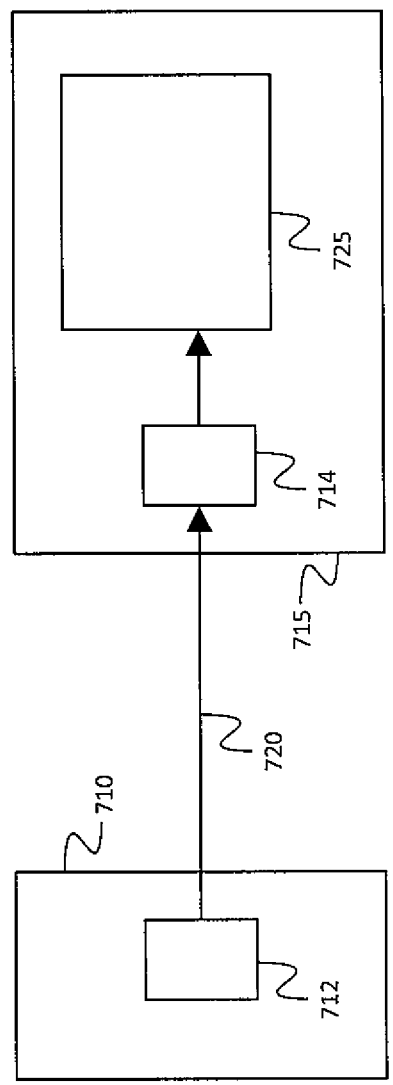
FIG. 5 is a block diagram of a system including a display, according to an embodiment of the present invention.

Referring to FIG. 5, in one embodiment, a system generating video data, such as a computer 710 including a video generator (e.g., a graphics card) 712 is connected through a data link 720 to a display 715 including a display panel 725 and a display processor 714 (e.g., a timing controller (TCON)). The video generator 712 generates video data, and encodes the video data using a method according to an embodiment of the present invention. The display processor 714 receives the encoded video data, decodes it, and displays it on the display panel 725. Here, in embodiments of the present invention, the display panel 725 is an organic light emitting diode (OLED) display panel or a liquid crystal display (LCD) panel.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The apparatus for encoding and decoding video data and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the apparatus for encoding and decoding video data may be formed on one integrated circuit (IC) chip or on separate IC chips. Further, the various components of the apparatus for encoding and decoding video data may be implemented on a flexible printed circuit film, a tape carrier package (TCP), a printed circuit board (PCB), or formed on a same substrate as the apparatus for encoding and decoding video data. Further, the various components of the apparatus for encoding and decoding video data may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although exemplary embodiments of a method and apparatus for temporal reference coding with light coding systems for display systems have been specifically described and illustrated herein, many modifications and variations will be apparent to those skilled in the art. Accordingly, it is to be understood that a method and apparatus for temporal reference coding with light coding systems for display systems constructed according to principles of this invention may be embodied other than as specifically described herein. The invention is also defined in the following claims, and equivalents thereof.

What is claimed is:

1. A method for coding a sequence of image frames, the method comprising:
    partitioning a first frame of the sequence of image frames into a first plurality of blocks comprising a first block;
    partitioning a second frame of the sequence of image frames into a second plurality of blocks comprising a second block,
        the second frame immediately following the first frame in the sequence of image frames,
        the second block being in a same position in the second frame as a position, within the first frame, of the first block, and
        the second block being the same size as the first block;
    calculating a difference between the second block and the first block to form a difference block;
    coding the difference block, to form a coded difference block; and
    adding a pseudorandom variation to the difference block in a pixel location of the difference block having a pixel value of zero.

2. The method of claim 1, further comprising transmitting the coded difference block to a display.

3. The method of claim 2, further comprising transmitting the first block to the display.

4. The method of claim 1, wherein the coding of the difference block comprises coding the difference block utilizing a constant bit rate coding process.

5. The method of claim 1, wherein the coding of the difference block comprises coding the difference block utilizing a variable bit rate coding process.

6. The method of claim 1, further comprising:
    decoding the difference block to form a decoded difference block;
    adding the decoded difference block to an image block of a preceding frame to form a display image block; and
    displaying the display image block utilizing a display panel.

7. The method of claim 1, wherein a value of a pixel of the difference block is represented by an 8-bit binary number.

8. The method of claim 7, wherein the 8-bit binary number is an 8-bit binary floating-point number including:
    a signed significand; and
    an unsigned exponent.

9. The method of claim 8, wherein
    the signed significand is a 4-bit signed significand; and
    the unsigned exponent is a 4-bit unsigned exponent.

10. A system, comprising:
    a video generator; and
    a display,
    the video generator being configured to:
        generate a sequence of image frames;
        partition a first frame of the sequence of image frames into a first plurality of blocks comprising a first block;
        partition a second frame of the sequence of image frames into a second plurality of blocks comprising a second block,
            the second frame immediately following the first frame in the sequence of image frames,
            the second block being in a same position in the second frame as a position, within the first frame, of the first block, and
            the second block being the same size as the first block;
        form a difference block between the second block and the first block;
        code the difference block, to form a coded difference block; and
        add a pseudorandom variation to the difference block in a pixel location of the difference block having a pixel value of zero.

11. The system of claim 10, wherein the video generator is further configured to transmit the coded difference block to the display.

12. The system of claim 11, wherein the video generator is further configured to transmit the first block to the display.

13. The system of claim 10, wherein the coding of the difference block comprises coding the difference block utilizing a constant bit rate coding process.

14. The system of claim 10, wherein the coding of the difference block comprises coding the difference block utilizing a variable bit rate coding process.

15. The system of claim 10, wherein the display is configured to:
    decode the difference block to form a decoded difference block;
    add the decoded difference block to an image block of a preceding frame to form a display image block; and
    display the display image block utilizing a display panel.

16. A system, comprising:
    a video generator; and
    a display,
    the video generator being configured to generate a sequence of image frames and comprising:
        means for partitioning a first frame of the sequence of image frames into a first plurality of blocks comprising a first block;
        means for partitioning a second frame of the sequence of image frames into a second plurality of blocks comprising a second block, the second frame immediately following the first frame in the sequence of image frames, the second block being in a same position in the second frame as a position, within the first frame, of the first block, and the second block being the same size as the first block;

means for forming a difference block between the block of the second block and the first block;

means for coding the difference block, to form a coded difference block; and means for adding a pseudorandom variation to the difference block in a pixel location of the difference block having a pixel value of zero.

* * * * *